Jan. 8, 1929.                                                    1,697,989
R. C. McWANE
AUTOMATIC SHUT-OFF VALVE
Filed Dec. 15, 1927
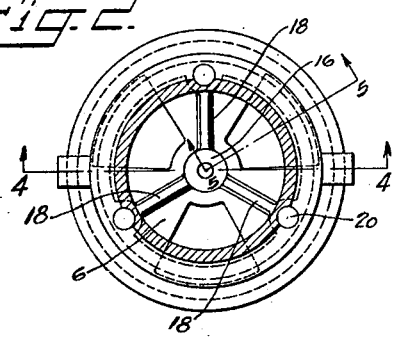
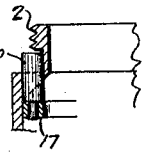
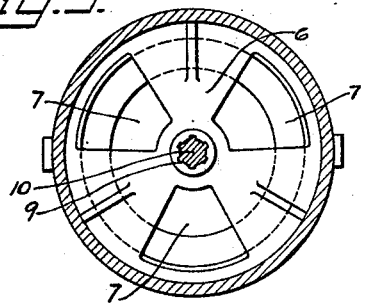
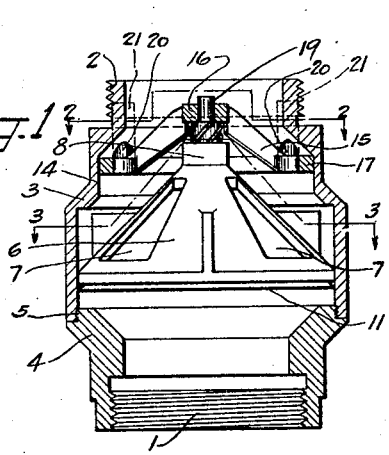
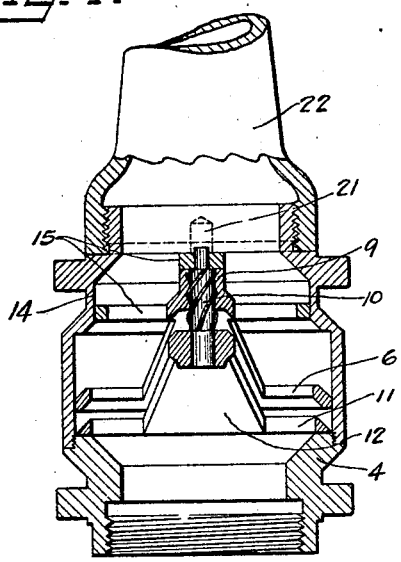
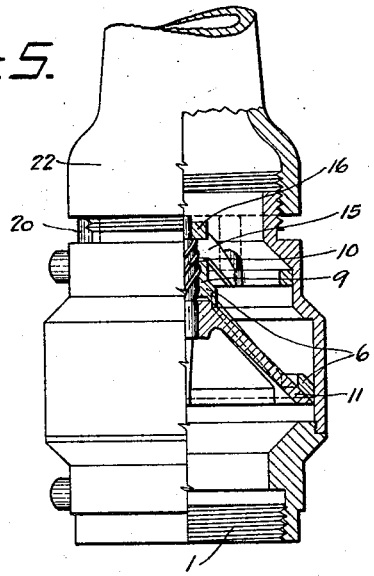
Robert C. McWane INVENTOR
BY O. V. Thiele
ATTORNEY Patented Jan. 8, 1929.

1,697,989

UNITED STATES PATENT OFFICE.

ROBERT C. McWANE, OF RIDGEWOOD, NEW JERSEY.

AUTOMATIC SHUT-OFF VALVE.

Application filed December 15, 1927. Serial No. 240,106.

My invention relates to fire hose used to convey water from a hydrant or from the pump of a fire engine to the fire.

It happens not infrequently that for one reason or another it becomes necessary to take off the nozzle at the end of the hose nearest the fire. Thus, the particular nozzle on the hose may not be the right one for the purpose in hand. It may for example be one adapted to throw water in the ordinary way on an open fire and the fireman may want to change it for one specially adapted for getting at a fire in a wall or for a nozzle for some other special purpose. Or it may be found necessary to add one or more hose lengths. If there are no means at the fire end of the hose for shutting off the water, word must be sent back to the hydrant or engine and the water must be shut off at that point until the necessary change has been made, after which word must be sent back to turn the water on again. The fireman manipulating the fire end of the hose is of course often at a considerable distance from the hydrant or engine and frequently at a point invisible from the other end of the hose. Considerable delay may therefore be involved in making the change.

I am aware that valves have been proposed heretofore for the purpose of shutting off the water at the end nearest the fire, but they have all be impractical for one reason or another. To be adapted for the purpose, such a valve should be of a dimension not exceeding appreciably the ordinary coupling, and should present no external projections which might catch on objects when the valve is located between two hose lengths. It is in addition highly desirable that such a valve be automatic in the sense that the mere uncoupling shuts off the water and that coupling up the nozzle or an additional length of hose opens it.

It is the purpose of this invention to provide a shutoff valve of the kind described having the desirable features pointed out.

The invention is illustrated in the single sheet of drawings herewith in which Fig. 1 is a central longitudinal section of my improved shutoff valve; Fig. 2 is a section on line 2—2 of Fig. 1; Fig. 3 is a section on line 3—3 of Fig. 1; Fig. 4 is a section on line 4—4 of Fig. 2; Fig. 5 is a view similar to that of Fig. 4, showing the valve in a closed position, the left half of the figure being an outside view; and Fig. 6 is a fragmentary longitudinal section through one of the pins. In Figs. 4 and 5 a portion of the adjoining nozzle appears.

As will be clear from an inspection of the drawings, the exterior appearance of the valve is similar to that of the ordinary hose coupling, the device being only slightly larger. To couple it into the hose line between two hose lengths or between a hose length and the nozzle, it is interiorly and exteriorly threaded at its two ends respectively, as shown at 1 and 2. The valve housing comprises the two parts 3 and 4, screwed together permanently at 5. Pressed or otherwise secured firmly into place in the part 3 is the conical partition 6. This is provided with the three sector shaped ports 7, which are each a little less than 60 degrees in size and which are symmetrically distributed circumferentially. The central hub 8 of the partition 6 is interiorly threaded with plural threads of steep pitch, as shown at 9. These threads are engaged by the threads of the screw 10, which is firmly secured to valve proper 11. This valve 11 is also conical in shape and its exterior surface fits accurately into the interior surface of the partition 6. The valve 11 also has ports, alternating with solid sectors 12. The latter are of such size that when the valve and partition are in contact in the proper relative position, as at Fig. 1, they close the ports of the partition. The valve 11 is capable of reciprocating travel between the position shown in Fig. 4, where it is in contact with the end piece 4, and the position it occupies in Fig. 5, where it is in contact with partition 6. As it travels between these two positions, it also rotates, this rotary motion being caused by the screw turning in the hub 8. The threads of the screw are such and they are so located that in the position of the parts shown in Fig. 4 the ports in the partition and those of the valve are in alinement, while in the position of Fig. 5 the solid sectors of the valve are opposite the ports of the partition and close them.

The apparatus is coupled into the hose line to receive the water pressure from the lower end as viewed in the figures. This pressure therefore tends to force the valve toward the partition into its closed position, and this is the position the valve assumes as the nozzle is screwed off while the hose is under pressure and which it keeps as long as the nozzle is not attached. The mechanism for automatically forcing the valve 11 into the position of Fig. 4 and so to open it as the nozzle or the coupling of a further length of hose are screwed into place will next be described.

The upper portion of the housing 3 has the cylindrical interior 14, axially alined with conical partition 6 and valve 11. Reciprocable in it is the spider 15. This spider comprises a ring 16, slidably engaging the reduced cylindrical extension 19 of the screw 10, the ring 17, which engages the cylindrical interior of the casing, and the three legs 18 connecting the two. The ring 17 has unitary with it or firmly secured to it the three short cylindrical rods or pins 20, extending into and reciprocable in corresponding holes in the casing. Their upper ends are exposed as will be evident particularly from Fig. 6, and the bottom of the nozzle engages them as it is screwed on. In Fig. 5 one of them appears at the left, the bottom of the nozzle 22 just engaging it. As the nozzle is screwed on further, these three projecting pins are forced down by the bottom of the nozzle and in moving downward carry the ring 17 of the spider and so the entire spider down with them. The ring 16 of the spider, contacting with the upper end of the screw 10 where the shoulder appears surrounding the pin 9, forces the screw and the valve 11, which is unitary with it, away from partition 6. At the same time the screw, threaded as it is in the stationary hub 8, is forced to rotate and in doing so rotates the valve 11 with it. By time nozzle 22 has been screwed on all the way and the pins 20 thereby forced in all the way, carrying spider 15 and valve 11 with them, the latter reaching its position against the piece 4 as shown in Fig. 4, the valve has been caused to rotate into the position in which the ports through it are in alinement with those of the partition. The passage for the water is then wide open.

It will be noted that the ends of the pins 20 are not engaged by the bottom of the nozzle until the latter has been screwed on some distance, so that as the valve begins to open no objectionable amount of water will escape between the nozzle and the valve. On taking the nozzle off on the other hand the valve will be closed before the nozzle is screwed off all the way.

The dimensions of the valve and specifically the port areas are such that no objectionable restriction is presented to the flow of water. As a matter of fact the presence of the valve results in the desirable feature that the whirling motion of the water, which it is apt to acquire in its passage through the hose and which decreases the distance to which the water can be thrown, is thereby broken up. Obstructing rods are sometimes cast or otherwise secured into nozzles for this very purpose, extending across the free inner area. My valve incidentally secures the same effect.

It will be obvious that some departures may be made in practice from the precise form of my invention as above described without losing the inventive idea.

What I claim is:—

1. In apparatus of the class described the combination of a housing open at both ends, a transverse partition therein having a plurality of ports, a valve member reciprocable in the casing and having a plurality of imperforate portions and a plurality of ports similar in shape and arrangement to those of the partition, the valve portion being adapted in one of its positions to engage the partition, the conformation of the partition and the valve member being such that the imperforate portions of each close the ports of the other when the two are in contact, and means automatically to rotate the valve as it moves away from the partition to aline its ports with those of the partition.

2. In apparatus of the class described the combination of a housing open at both ends, a transverse partition fixed therein and having a plurality of ports, a threaded element fixed relatively to the casing, a valve member reciprocable in the casing and having a portion engaging the threads of the threaded element in such manner that as it moves axially it also rotates, the valve member having imperforate portions and a plurality of ports similar in shape and arrangement to those of the partition, the valve member being adapted in one of its positions to engage the partition, the conformation of the partition and the valve member being such that when the two are in engagement the imperforate portions of each close the ports of the other, and an abutment limiting the motion of the valve away from the partition at a point where the two sets of ports are in alinement.

3. In apparatus of the class described the combination of a generally cylindrical housing open at both ends, a conical partition whose base is fixed to the casing and which is coaxial with the housing, a valve member in the housing on the concave side of the partition and similar in shape to it and pointing in the same direction, an abutment in the housing, the valve member being reciprocable between the abutment and the partition, the valve member and the partition having sector-shaped ports and sector-shaped solid portions, the solid portions of the two mutually closing their ports when the two are in engagement, the partition and the valve member having engaging thread means adapted to rotate the valve member as it moves away from the partition so that in its position in engagement with the abutment the two sets of ports are in alinement.

4. Apparatus according to claim 3, the thread means comprising an interiorly threaded hub integral with the partition and a screw fixed to the valve member.

5. Apparatus according to claim 3, the housing being threaded at the end toward which the conical partition points, the apparatus further comprising a fitting threaded to engage the housing threads, and means automatically to force the valve member away from the partition as the fitting is screwed on.

6. Apparatus according to claim 3, the housing being threaded at the end toward which the conical partition points, the apparatus further comprising a fitting threaded to engage the housing threads, and a spider automatically to force the valve member away from the partition as the fitting is screwed on, the spider comprising a portion engaging the end of the screw and portions engaging the fitting.

7. Apparatus according to claim 3, the housing being threaded at the end toward which the conical partition points, the apparatus further comprising a fitting threaded to engage the housing threads, and a spider automatically to force the valve member away from the partition as the fitting is screwed on, the spider comprising a ring slidably engaging the cylindrical interior of the housing, a second ring engaging the end of the screw, arms connecting the two rings, and pins extending through the housing and adapted to be engaged by the bottom of the fitting as it is screwed on, whereby the spider and the valve member are forced away from the partition as the fitting is screwed on and the valve member is left free to be forced against the partition by water pressure from the concave side of the valve member.

ROBERT C. McWANE.